United States Patent [19]

Millot

[11] 4,240,874
[45] Dec. 23, 1980

[54] PROCESS FOR CONTROLLING THE REACTIVITY EFFECTS DUE TO THE POWER VARIATIONS IN PWR NUCLEAR REACTORS

[75] Inventor: Jean-Paul Millot, Elancourt, France

[73] Assignee: Framatome, Paris, France

[21] Appl. No.: 917,401

[22] Filed: Jun. 20, 1978

[51] Int. Cl.³ .............................................. G21C 7/06
[52] U.S. Cl. .................................. 176/22; 176/36 R;
    176/86 R; 176/86 L
[58] Field of Search .................. 176/20 R, 20 SS, 21,
    176/22, 24, 25, 86 R, 86 L, 86 M, 36 R, 35, 34

[56] References Cited

U.S. PATENT DOCUMENTS

| 4,057,463 | 11/1977 | Morita | 176/36 R |
| 4,062,725 | 12/1977 | Beuilacqua | 176/36 R |
| 4,075,059 | 2/1978 | Bruno | 176/24 |

*Primary Examiner*—Donald P. Walsh
*Attorney, Agent, or Firm*—Haseltine and Lake

[57] ABSTRACT

A process for controlling the reactivity effects due to the power variations in a nuclear reactor using pressurized water comprises moving movable clusters of absorbent material inside the fuel units of the reactor, the clusters comprising first sets of which at least one has an anti-reactivity of less than 700 ppht, and a second set which is composed of very absorbent clusters, the first sets being moved solely as a function of the power required of the turbine to vary the power of the reactor and the second set being moved simultaneously in dependence on the difference between the actual mean temperatures of the reactor core and a reference temperature which is a function of the level of power required.

5 Claims, 9 Drawing Figures

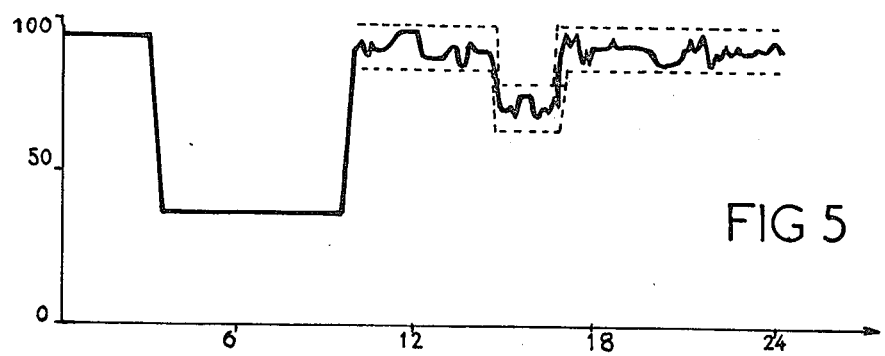
FIG 5
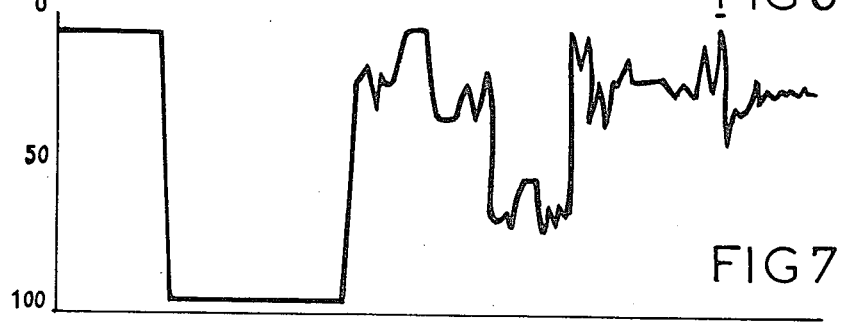
FIG 6
FIG 7
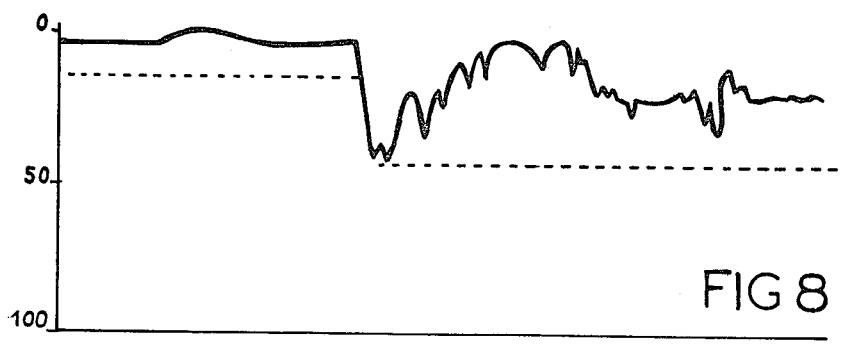
FIG 8
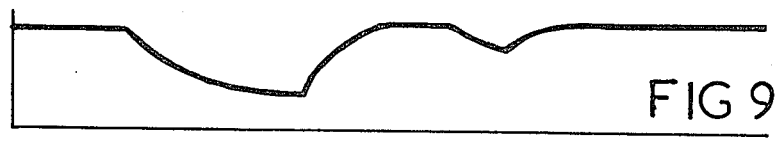
FIG 9

PROCESS FOR CONTROLLING THE REACTIVITY EFFECTS DUE TO THE POWER VARIATIONS IN PWR NUCLEAR REACTORS

The invention relates to a process for controlling the reactivity effects due to the power variations in a nuclear reactor using pressurized water, which process employs the movement of movable clusters of absorbent material inside the fuel units, and employs soluble boron, in order to correct the long term reactivity effects.

The operation of power reactors can be imagined to be a juxtaposition or superposition of three fundamental types of operation. These three types of operation are:
the base-load power station operation in which the power required is constant. This power can be fixed at any level between 15 and 100% of the nominal power.
the daily load response operation, following a virtually constant profile which is in the form of a succession of plateaux at levels situated between 30 and 100% of the nominal power. In this type of operation, it must be possible to return to nominal power at any time and at very high speed.
the so-called "remote-control" operation in which the power fluctuates randomly within a power range which is centered on a reference value $P_0$ and has an amplitude of the order of 20% of the reference power.

The fluctuations can cause power variations of the order of, on average, 1.5% per minute, it being possible for exceptional variations to range up to 18% per minute. This type of operation obviously assumes that an instantaneous return to nominal power is possible at any time.

In the case of nuclear reactors, the daily load response operation and remote-control operation present very great problems with regard to controlling the reactivity effects due to the power variations.

In reactors using pressurized water, it is necessary for a power variation from a power P1 to a power P2, to compensate reactivity changes due:
in the short term, to temperature variations in the moderator and the fuel during power variations required of the turbine, and
in the medium and long terms, to the production of xenon, the variations of which are staggered in time relative to the variations in the power required.

These two effects are of opposite sign, at least during the initial hours. Although the first virtually depends only on the power variation $\Delta P = P1 - P2$, the second also depends on the history of the core prior to the power variation and on the time which has elapsed since this variation took place.

Furthermore, the variations in the power produced by the reactor are obtained in practice by moving, inside the fuel units, clusters of neutron-absorbing material which comprise a greater or lesser number of absorbent elements of elongate shape or rods.

The power distribution in the reactor is obviously affected by the insertion of the control clusters into the fuel units and, in order to satisfy the safety criteria, the variations in the spatial distribution of power in the reactor must be kept to a minimum value when the control clusters are inserted.

Furthermore, the axial power distribution is essentially in equilibrium at any time in the cycle, taking into account the axial distribution of water density which exists at full power, when the control clusters are withdrawn. A change in this distribution of water density following a variation in power level leads to a perturbation of the reactivity equilibrium in favor of the upper part of the core.

Various control devices have been devised which should make it possible to compensate to some extent the effects described above. These control systems employ long and strongly absorbent clusters of absorbent material. Such strongly absorbent clusters are called "black clusters".

A first type of control system employs such black clusters which are inserted a short distance into the fuel units, the greater part of the reactivity effects being compensated by large corrections which are made to the concentration of soluble boron contained in the moderator by introducing either a soluble boron compound or pure water into the primary circuit.

A second type of control system employs black clusters which are deeply inserted into the fuel units, and partial clusters which are arranged in the bottom of the core in order to re-establish the spatial distribution of the flux, which has been strongly perturbed by the deeply inserted black clusters. An additional compensation corresponding to the evolution of xenon is carried out by controlling the soluble boron in the primary circuit.

In all cases, the position of the black clusters in the core is controlled so as to keep the means temperature of the core at a reference value which is a function of the power required of the turbine.

Both systems have disadvantages which make their use difficult in the case of the operation of the reactor in response to load or of the remote-control operation of the reactor.

In the case of the first control system, it is not in fact possible to guarantee an instantaneous return to the nominal power because the action on the soluble boron is not instantaneous. Furthermore, the action on the soluble boron must be very considerable when rapid load variations occur in the reactor, especially at the end of the lifetime of the fuel.

In the case of the second control system, it is necessary to operate the reactor at high power using deep insertions of short clusters which very substantially perturb the distribution of local and spatial flux, which makes it more difficult to comply with the safety standards.

Finally, in both cases, the actions of the soluble boron and on the short clusters are manual, which makes it difficult to run the power station.

The use of control clusters which are less absorbent than the black clusters has been considered in order to avoid perturbing the flux distributions in the reactor core excessively.

The clusters of absorbent material are generally connected in sets, the movement of which are governed by a single device. Within this assembly, the reactivity of certain sets can be reduced, for example by limiting the number of rods of absorbent material or the amount of material per rod in the clusters of these sets.

Quantitatively, the more or less absorbent character of a set formed by an assembly of clusters of absorbent material will be determined by its anti-reactivity measured in ppht (parts per hundred thousand or $10^{-5}$). This anti-reactivity determines the substractive effect of the set, when it is introduced, on the effective multiplication factor of the keff reactor.

Thus a set which is called a strongly absorbent black set will have an anti-reactivity greater than 1,000 ppht, and a more weakly absorbent set, which will be referred to as a grey set, will have an anti-reactivity which is substantially less than 1,000 ppht.

However, such grey sets have the disadvantage that they act less rapidly on the reactivity, which makes it difficult to keep the core temperature very close to the reference temperature determined solely as a function of the power required of the reactor.

According to one aspect of the present invention, there is provided a process for controlling the reactivity effects due to the power variations in a nuclear reactor using pressurised water, said process comprising moving movable clusters of absorbent material inside the fuel units of said reactor, and varying the concentration of soluble boron in the primary fluid of said reactor in order to correct long-term reactivity effects, wherein first sets of said movable clusters, at least one of which sets has an anti-reactivity of less than 700 ppht, are moved solely as a function of the power required of the turbine to vary the power of the reactor, a second set of said movable clusters, which is composed of very absorbent clusters, is simultaneously moved as a function of the difference which exists at any time between the mean temperature of the reactor core and a reference temperature, which is a function of the level of power required, said second set being movable between control limits which are defined by the mode of operation of the reactor and the state reached by the core of this reactor, and said concentration of soluble boron in said primary fluid of the reactor is varied to keep said second set within said control limits thereof during the correction of long-term reactivity effects.

According to another aspect of the present invention there is provided a process for controlling the reactivity effects due to the power variations in a nuclear reactor using pressurized water, said process comprising moving movable clusters of absorbent material inside fuel units of said reactor, in the case of a remote-control operation of said reactor at a power varying around a given reference power, wherein first sets of clusters of absorbent material, at least one of which sets has an anti-reactivity of less than 700 ppht, are moved solely as a function of the power required of the turbine to vary the power of the reactor as a function of the programme of the power required, a second set composed of very absorbent clusters, is simultaneously moved as a function of the difference which exists at any time between the mean temperature of the reactor core and a reference temperature, which is a function of the level of power required, said second set being movable between control limits which are chosen so as to compensate, at the same time as the temperature variations, and by means of said second set alone, for the reactivity variation due to xenon variations, and no change is made in the concentration of soluble boron in the primary fluid.

The invention will be more fully understood from the following description of an embodiment of a method according to the invention for controlling the reactivity effects in the case of a daily load response operation and in the case of a remote-control operation of a power station, given by way of example only, with reference to the accompanying drawings.

In the drawings:

FIGS. 5 to 9 illustrate the changes in various parameters in the case of a remote-control operation of the power station.

Figure 1:
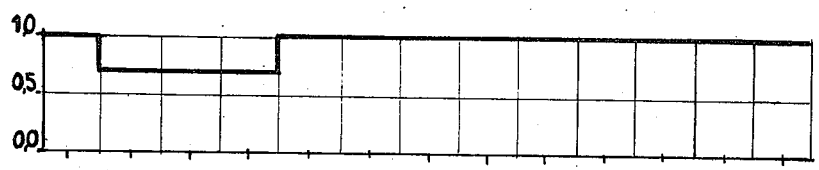
FIGS. 1 to 4 illustrate the changes in various parameters in the case of a daily load response.

In the embodiment chosen, the reactor is a reactor of the type using pressurized water and having three loops, which it is desired to operate by daily load response and remote control.

For this purpose, an assembly called a grey assembly, of four sets of clusters of absorbent material are used, the first two sets, which are referred to as G1 and G2, being grey sets, that is to say sets having an anti-reactivity of less than 700 ppht, and preferably between 400 and 700 ppht. The other two sets forming the assembly are two black sets N1 and N2 having an anti-reactivity which is equal to or greater than 1,000 ppht.

This grey assembly is maneuvered as a whole in such a way that the sets are positioned successively in the reactor either by successively moving the sets relative to one another or by moving several sets at the same time.

The arrangement of the grey assembly in the reactor is determined by two unequivocal means from the power level required of the tubine. The positioning of this grey assembly can therefore be entirely automated by controlling the insertion of the clusters by a signal derived from the load demand signal from the turbine. This insertion which depends on the power, is predetermined analytically and can be adjusted on site according to periodic tests so as to take account of the state reached by the core.

The structure of the grey assembly and the overlapping of the various sets of which it is formed are chosen so as to minimize the perturbations of local and spatial flux, taking into account, on the one hand, the effect of axial redistribution of water density, causing the power distribution to move towards the top of the core when the power drops, and the fact that the axial power distribution is drawn towards the bottom of the reactor core when the control clusters are inserted.

It is therefore desired to optimize the flux distribution for all positions of the grey assembly in the reactor.

Apart from the above described grey assembly, there is a control assembly, referred to as the control set or set R, which is composed of black clusters and is therefore very absorbent.

The set R is controlled so as to keep the mean temperature of the core at a value which is as close as possible to a reference temperature which is a function only of the power required of the turbine and which is the optimal operating temperature of the reactor. The control by the set R must be such that the temperature difference between the mean temperature of the core and the reference temperature is never greater than that which the turbine is capable of withstanding.

In view of its strong anti-reactivity, the set R is only subjected to movements of small amplitude in order to maintain the temperature of the core. Furthermore, the insertion of the set R always remains relatively slight, the set being kept within an operating range which is predetermined according to the type of operation of the reactor (daily load response or remote control) and according to the state of the reactor core.

When the set R approaches or oversteps one of the two limits of the range which has been assigned to it, an alarm device or an automatic control device makes it possible to act manually or automatically on the soluble boron concentration, either by adding a soluble boron compound to the primary circuit or, on the other hand, by adding pure water to this circuit, in order to bring the set R back within the predetermined control range.

The action on the soluble boron concentration therefore has the dual purpose of compensating the long term xenon effects, as in the earlier systems, and of bringing the control set back within its control range in the case where it exceeds or is likely to exceed the limits assigned to the control set.

In certain cases where the system for diluting the soluble boron is likely to be used to the limit of its capacity, at the end of the fuel cycle, an automatic cooling of the primary coolant or a partial withdrawal of the grey assembly will make it possible to follow the load program required of the turbine.

Rather exceptionally, and in certain cases of load response, an insertion of the control set R will be used in order to bring back to normal a flux distribution which is tending to move towards the top of the core.

This will be referred to as the use of the control set for controlling a nascent oscillation of xenon.

In fact, the "relative" weight of the grey clusters cannot be absolutely optimal at all power levels; the calculation and design of these grey clusters, as well as their inclusion inside sets which are maneuverable as a whole, is optimized for a certain power range but, during variations required at certain power levels, the equilibrium of the axial power distribution can be perturbed towards the bottom of the core. This perturbation of equilibrium can cause a xenon oscillation if the core is unstable.

However, the initial perturbation of the power equilibrium is smaller than with the conventional systems. The amplitude of the xenon oscillation is therefore smaller and does not cause axial power peaks of too large an amplitude for a time which is at least equal to the period of the oscillation.

It therefore suffices to control the oscillation during its second half-period, that is to say when the perturbation of power equilibrium has reversed itself and when the power distribution tends to show a peak at the top of the core.

It then suffices to insert the control set R by about 10% for a few hours in order to stabilize the core.

This insertion of the set R can be made automatic as a function of the operation conditions.

Of course, this function of the control set is not a priority function relative to its main function of control.

In the case of remote-control operation, the range of maneuver of the set R is broadened in such a way that the set R can also compensate for the small reactivity variations due to the xenon variations associated with this mode of operation, without going outside its range. Thus, in the case of remote control around a constant reference power $P_0$, no action on the boron is necessary.

FIGS. 1 to 4 show the change in various parameters in the case of a daily load response, the power required of the reactor, expressed as a fraction of the nominal power of this reactor over a period of 24 hours, being shown in the graph of FIG. 1.

It is seen from this graph that, during the first two hours of the operating cycle, the reactor operates at nominal power, that, during the following six hours, the reactor operates at 70% of the nominal power, and that, during the remainder of the cycle, the reactor operates at its nominal power.

Figure 2:
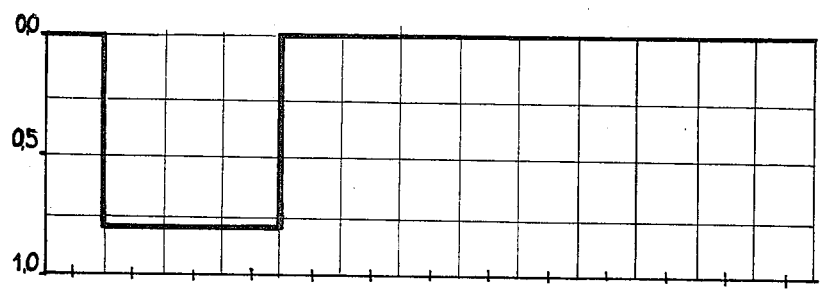

The graph of FIG. 2 shows, as a function of time and for the same 24 hour period, the position of the grey assembly, which is only determined by the power required of the reactor, and shows that, during the 6 hour period when it is desired to reduce the power produced by the reactor, the grey assembly is inserted by 80% inside the fuel units.

Figure 3:
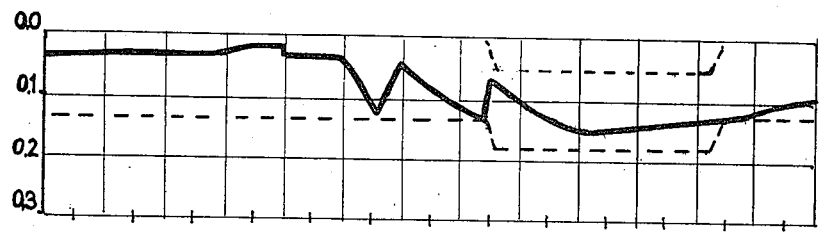

FIG. 3 shows, for the same interval of time, the position of the control set as a fraction of the insertion of this control set into the fuel units. It is seen that this insertion essentially varies between 5 and 15%, which is therefore very much less than the insertion of the grey assembly, and that, for a period corresponding to the control of a xenon oscillation, the control range of the set R is displaced to give a greater insertion.

Figure 4:
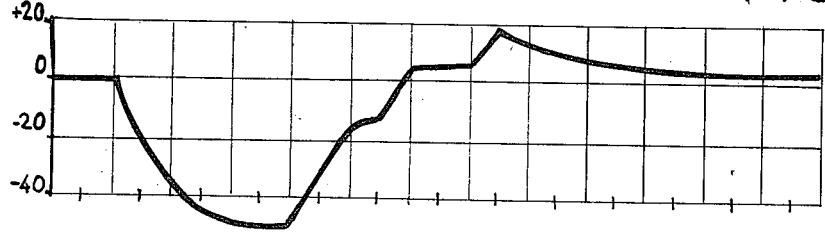

The graph of FIG. 4 shows the differences in boron concentration relative to a mean value corresponding to the concentration at the start of the cycle in question.

It is seen that the change in the concentration of soluble boron serves the purpose, on the one hand, of compensating the long-term xenon effects by bringing the control set R back within its range when this control set is on the point of overstepping the limits which have been assigned to it, and, on the other hand, of displacing the control range of set R during the control of an oscillation.

FIG. 5 shows the power required of the reactor during a 24 hour period within which the reactor is operated by remote control for a certain time.

For approximately the first ten hours, the power station operates in response to load at 100% of the nominal power, and then at 40% of this nominal power, and, after the tenth hour, the power station operates by remote control with a variation in the power within a range having a breadth of approximately 15% of the nominal power of the reactor.

FIG. 6 shows the remote-control signal corresponding to the power programme shown in FIG. 5.

The remote-control signal remains constant at zero until the power station comes under remote control. This remote-control signal is received by an entire grid of power stations, each of which participates in the remote control of the grid by a fraction of its nominal power which can reach 20% of this nominal power.

FIG. 7 shows a graph giving the fraction of insertion of the grey assembly as a function of time, this curve being homothetic with the curve showing the power as a function of time.

FIG. 8 shows the fraction of insertion of the control set as a function of time during the 24 hour period in question. It is seen that the range of maneuver of this control set R is modified when the daily load response changes to the remote-control operation.

Finally, FIG. 9 shows variations in the boron concentration around a mean value for compensating for the long-term xenon effects in the load response operation and for bringing only the control set R back within its control range in the case of remote control where the set R also compensates the xenon change.

It is seen that the system which has now been described has numerous advantages and that, in particular, this system makes it possible to operate the reactor automatically either by daily load response or by remote control, whilst retaining the capacity, at any time, to return instantaneously to the nominal power.

In fact, one position of the grey assembly corresponds by two unequivocal means to each power level, and the position of the grey assembly can therefore be made to vary automatically as a function of the program of the power required.

The temperature of the core is simultaneously controlled by moving the control set through a small amplitude. The above described system also has the advantage that it minimizes the flux perturbations in the case of load response with rapid gradients. This system also permits a remote-control operation without intervention of the operator and with reduced wear of certain primary equipment such as the mechanisms for moving the clusters.

However the invention is not intended to be restricted to the embodiment which has now been described; on the contrary, it comprises all the variants thereof and points of detail can be modified without thereby going outside the scope of the invention.

Thus, the grey assembly used for controlling the power of the reactor as a function of the power required of the turbine can be formed, depending on whether the pressurized water reactor used has two, three or four loops and is charged with fuel elements of 10 to 14 feet in height, of two, three of four sets, at least one of which is a grey set, that is to say a set having an anti-reactivity of less than 700 ppht.

Also when the set R approaches or oversteps one of the two limits, the action of the soluble boron concentration can by started manually, be means of an alarm system, or automatically as a function of the position of the set R or of its movement which is followed at all times by means of automatic control.

The set R can also have a reference position and the action of the boron can be started as soon as the set R moves away from this position by a given percentage.

There is thus provided a process for controlling the reactivity effects due to the power variations in nuclear reactors using pressurized water, which process employs the movement of movable clusters of absorbent material inside the fuel units, and employs soluble boron, in order to correct the long-term reactivity effects, and which process can in fact be used in the case of daily load response or of remote control of the power station, does not excessively perturb the flux distributions in the reactor and retains at any time a maximum capacity to return instantaneously to the nominal power of the reactor.

I claim:

1. A process for controlling the reactivity effects due to the power variations in a nuclear reactor using pressurized water, said process comprising moving sets of movable clusters consisting of a certain number of full-length rods of absorbent material inside the fuel units of said reactor, said rods being called full-length rods since their lengths are the same as the length of the fuel units and varying the concentration of soluble boron in the primary fluid of said reactor in order to correct long-term reactivity effects, wherein first sets of said movable clusters, at least one of which sets consisting of clusters having a reduced number of full-length rods of absorbent material has an anti-reactivity of less than 700 ppht, are moved solely as a function of the power required of the turbine, moved by the steam produced by the reactor, a second set of said movable clusters, which is composed of very absorbent clusters consisting of a great number of full-length rods of absorbent material, is simultaneously moved as a function of the difference which exists at any time between the mean temperature of the reactor core and a reference temperature, which is a function of the level of power required, said second set being movable between control limits which are defined by the mode of operation of the reactor and the state reached by the core of this reactor, and said concentration of soluble boron in said primary fluid of the reactor is varied to permit regulating the temperature by moving said second set within said control limits thereof in addition to the normal correction of long-term reactivity effects.

2. A process according to claim 1, wherein said first sets which control the power required of the turbine constitute an assembly and move successively with overlapping, their position being periodically adjusted as a function of the power so as to take account of the state reached by the reactor core.

3. A process according to either claim 1 or claim 2, wherein a signal is produced by said second set when it oversteps one of said control limits thereof to indicate that action is necessary on said concentration of soluble boron.

4. A process according to either claim 1 or claim 2, wherein a signal is produced by said second set when it approaches one of said control limits thereof to automatically cause a variation in said soluble boron concentration.

5. A process for controlling the reactivity effects due to the power variations in a nuclear reactor using pressurised water, said process comprising moving movable clusters of absorbent material inside fuel units of said reactor, in the case of a remote-control operation of said reactor at a power varying around a given reference power, wherein first sets of clusters of absorbent material, at least one of which sets has an anti-reactivity of less than 700 ppht, are moved solely as a function of the power required of the turbine to vary the power of the reactor as a function of the programme of the power required, a second set composed of very absorbent clusters, is simultaneously moved as a function of the difference which exists at any time between the mean temperature of the reactor core and a reference temperature, which is a function of the level of power required, said second set being movable between control limits which are chosen so as to compensate, at the same time as the temperature variations, and by means of said second set alone, the reactivity variations due to xenon variations, and no change is made in the concentration of soluble boron in the primary fluid.

* * * * *

UNITED STATES PATENT AND TRADEMARK OFFICE
CERTIFICATE OF CORRECTION

PATENT NO. : 4,240,874
DATED : December 23, 1980
INVENTOR(S) : JEAN-PAUL MILLOT

It is certified that error appears in the above-identified patent and that said Letters Patent are hereby corrected as shown below:

In the Heading insert:

[30] Foreign Application Priority Data

June 23, 1977     France     77-19316

Signed and Sealed this

Twenty-eighth Day of April 1981

[SEAL]

*Attest:*

RENE D. TEGTMEYER

*Attesting Officer*     *Acting Commissioner of Patents and Trademarks*